United States Patent Office 3,547,861
Patented Dec. 15, 1970

3,547,861
**NOVEL FLUORINATED ACRYLATES
AND POLYACRYLATES**
Louis Gene Anello, Basking Ridge, and Richard Francis Sweeney, Dover, N.J., and Morton Herbert Litt, University Heights, Cleveland, Ohio, assignors to Allied Chemical Corporation, New York, N.Y., a corporation of New York
No Drawing. Filed Apr. 12, 1968, Ser. No. 721,114
Int. Cl. C08f 3/62, 15/16
U.S. Cl. 260—89.5    39 Claims

ABSTRACT OF THE DISCLOSURE

Novel fluorinated acrylates of the formula

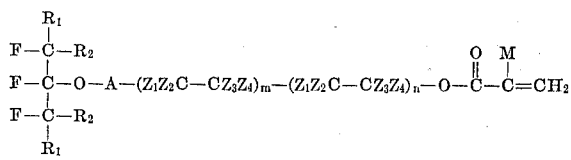

wherein (a) $R_1$ and $R_2$ may be F, Cl, alkyl, haloalkyl, alkylene or haloalkylene groups,
(b) A is a radical of the formula $-CFR_3-CR_4R_5-$ in which $R_3$ and $R_4$ are independently selected from the group consisting of F and H, and $R_5$ is selected from the group consisting of F, H, Cl, Br and perfluoroalkyl,
(c) $Z_1$, $Z_2$, $Z_3$ and $Z_4$ may be independently selected from a variety of groups, particularly H, F, Cl and Br, provided that $Z_1$–$Z_4$ do not include more than two chlorine atoms or one bromine atom, and
(d) M is a member selected from the group consisting of H or $CH_3$, with the proviso that the terminal carbon atom in the $-(Z_1Z_2C-CZ_3Z_4)_n-$ group which is bonded to the $-O-$ atom is additionally bonded to two hydrogen atoms; are useful as monomers for the production of novel fluorinated polyacrylates which are valuable as oil, stain and water repellent compositions.

CROSS-REFERENCES TO RELATED APPLICATIONS (1) This application is a continuation-in-part of our co-pending application Ser. No. 633,359, filed Apr. 25, 1967, entitled "Telomers and Process for the Preparation Thereof."

Other related applications are:

(2) Co-pending application of Litt et al., entitled "Fluorinated Ethers," Ser. No. 492,276, filed Oct. 1, 1965, now U.S. Pat. 3,453,333.

(3) Co-pending application of Litt et al., entitled, "Fluorinated Ethers," Ser. No. 513,574, filed Dec. 13, 1965, now U.S. Pat. 3,470,256.

(4) Co-pending application of Anello et al., entitled "Novel Sulfates and Method for Their Preparation," Ser. No. 633,368, filed Apr. 25, 1967.

(5) Our co-pending application entitled "Novel Fluorinated Alcohols," Ser. No. 721,089, filed Apr. 12, 1968.

BACKGROUND OF THE INVENTION

A variety of fluorinated polyacrylic materials are known to be useful for the treatment of various substrates, particularly textiles, to impart thereto oil, stain and water repellency properties. Generally, such fluorinated polyacrylic materials comprise compounds containing a fluoroalkyl chain connected to an active acrylic moiety. The oleophobic and hydrophobic properties of these fluorochemicals are attributed, at least in part, to the low surface energy of the fluoroalkyl chain portion of the molecule. The active acrylic portion of the molecule provides a physical or chemical bond with the substrate surface which is treated. Although many of these prior art fluorinated acrylic materials provide acceptable levels of oil, stain and water repellency, not all these fluorinated acrylic materials exhibit both very high oil repellency properties and water repellency properties. Perhaps even more significantly, when such fluorinated acrylic materials have been used to coat substrates, particularly textile materials, to impart oil, stain and water repellency thereto, these agents are readily removed during laundering, washing or dry-cleaning treatments. Apparently, the bonds formed by these prior art materials with the treated substrate surfaces are unstable and when the substrate surfaces are exposed to repeated launderings, washing or dry-cleaning treatments, these bonds break and progressively more and more of the oil, stain and water repellency properties of the treated substrates are lost.

SUMMARY OF THE INVENTION

It is accordingly a major object of the invention to provide a novel class of fluorinated acrylic monomers capable of producing fluorinated acrylic polymers which produce high levels of oil, stain and water repellency effects when used to treat substrates, in combination with long durability of these effects, even when the treated substrate materials are subjected to repeated laundering, washing or dry-cleaning treatments.

Other objects and advantages of the invention will become apparent from the following description.

It has been found that the above-indicated objects of the invention may be accomplished when novel fluorinated acrylic monomers having the Formula I set forth below are polymerized to the corresponding polyacrylic materials and substrates are suitably treated with these polymeric materials.

The subject novel fluorinated acrylic monomeric materials have the following formula

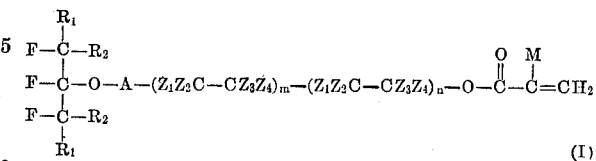

wherein (a) $R_1$ and $R_2$ are each F, Cl, alkyl or haloalkyl groups, or when taken together, are alkylene or haloalkylene groups forming a cycloaliphatic structure, which $R_1$ and $R_2$ groups may each have from 1 to 9 carbon atoms and which halogen atoms, if any, have an atomic weight not exceeding about 79.92, with the proviso that no more than two of the $R_1$ and $R_2$ groups are alkyl groups and no more than three of the $R_1$ and $R_2$ groups are haloalkyl groups;
(b) A is a radical of the formula $-CFR_3-CR_4R_5-$ in which $R_3$ and $R_4$ are independently selected from the group consisting of F and H, and $R_5$ is selected from the group consisting of H, F, Cl, Br and perfluoroalkyl;
(c) $Z_1$, $Z_2$, $Z_3$ and $Z_4$ may each be selected from the group consisting of H, F, Cl and Br provided that $Z_1$–$Z_4$ do not include more than two chlorine atoms or one bromine atom,
  (1) when at least two members of the group $Z_1$, $Z_2$, $Z_3$ and $Z_4$ are H or F, the remaining two members may each be a perhalomethyl group having the formula —C($X_a$)$_3$, wherein $X_a$ is a halogen atom having an atomic weight not exceeding about 79.91, (2) when $Z_1$ and $Z_3$ are each H or F, each of $Z_2$ and $Z_4$ may additionally be selected from the group consisting of —CF$_2$X$_b$, —Y$_1$—OY$_2$, —Y$_1$—Y$_3$ and —O—Y$_4$, wherein $X_b$ is an alkyl radical having from 1–8 carbon atoms, or a haloalkyl radical having from 1–8 carbon atoms in which haloalkyl radical the halogen atoms have an atomic weight not exceeding about 79.91; $Y_1$ is a saturated divalent alkylene bridging group or a saturated divalent haloalkylene bridging group in which the halogen atoms have atomic weights not exceeding about 79.91; $Y_2$ is a member selected from the group consisting of H and alkyl; $Y_3$ is aryl and $Y_4$ is alkyl, (3) $Z_3$ and $Z_4$ or $Z_1$ and $Z_3$ may be joined together to form a cycloaliphatic ring system;

(d) M is a member selected from the group consisting of H or CH$_3$, (e) *m* is an integer from 1–75; and (f) *n* is an integer from 0–75, with the proviso that the terminal carbon atom in the —($Z_1Z_2$C—C$Z_3Z_4$)$_n$— group which is bonded to the —O— atom is additionally bonded to two hydrogen atoms. The $Z_1$, $Z_2$, $Z_3$ and $Z_4$ substitutents, as indicated above, are independently selected. This is to be interpreted as meaning that not only may the $Z_1$, $Z_2$, $Z_3$ and $Z_4$ substituents be dissimilar to one another but also that these substituents in the —($Z_1Z_2$C—C$Z_3Z_4$)$_m$— moiety may be dissimilar to the $Z_1$, $Z_2$, $Z_3$ and $Z_4$ substitutents present in the —($Z_1Z_2$C—C$Z_3Z_4$)$_n$— moiety.

In preferred embodiments, the —$Z_1Z_2$C—C$Z_3Z_4$— moieties are selected from the group consisting of —CF$_2$—CF$_2$—, CF$_2$—CH$_2$—, —CF$_2$CClF—
—CF$_2$CF(CF$_3$)— and —CH$_2$CH$_2$—

When polymerized, the novel acrylic monomers of Formula I produce polymers having the recurring unit

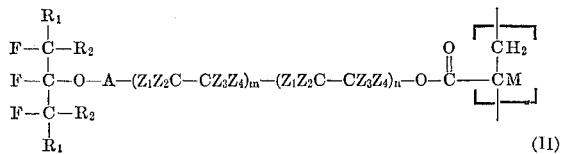

(II)

wherein $R_1$, $R_2$, A, $Z_1$, $Z_2$, $Z_3$, $Z_4$, M, *m* and *n* are as defined above. Preferably, *m* and *n* are integers from 1–40 and still preferably from 1–7.

The criticality in the molecules in the novel acrylic monomers of Formula I and the corresponding fluorinated acrylic polymers of Formula II is in the structrue of the tail portion of the molecule and its linkage to the remainder of the molecules. The tail portion of these molecules is characterized by the presence of a carbon atom linking an oxygen atom and a fluorine atom, in combination with two haloalkyl linkages, satisfying the remaining valences of the carbon atom linking the oxygen and fluorine atoms. The haloalkyl linkages are characterized by the presence of at least one fluorine atom on each carbon atom which is adjacent the carbon atom which links the oxygen and fluorine atoms. Additionally, the molecule is characterized by the fact that both carbon atoms which are linked to the oxygen atom contain at least one fluorine atom.

In the above Formula I, $R_1$ and $R_2$ may be the same or different and may be F or saturated straight-chain and branched-chain alkyl, haloalkyl, alkylene or haloalkylene groups of the type indicated.

The fluorinated acrylic monomers of Formula I may be prepared from the corresponding alcohols of the formula

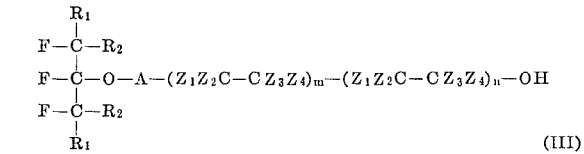

(III)

wherein $R_1$, $R_2$, A, $Z_1$, $Z_2$, $Z_3$, $Z_4$, *m* and *n* are as defined above, with the proviso that the terminal carbon atom in the molecule which is bonded to the OH group is additionally bonded to two hydrogen atoms, by reacting such alcohols with an acrylic compound of the formula

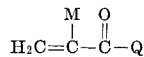

wherein M is H or CH$_3$ and Q is Cl, OH or OCH$_3$. The acrylic reagent may also be employed in the form of its anhydride which may be used in situ by reacting a mixture of glacial acrylic acid and perfluoroacetic anhydride with the alcohol reactant at below about room temperature.

The molar ratio of reactants is not critical and from about 0.1 mole to about 10 moles alcohol reactant per mole acrylic reactant may be employed to secure the desired reaction product. In order to secure highest yields, however, a substantially stoichiometric molar ratio should be employed, i.e. a molar ratio of about 1:1.

The reaction proceeds quite smoothly in the absence of a solvent. A suitable solvent, if desired however, may be employed to serve as a diluent and to facilitate the reaction at elevated temperatures. Generally speaking, any solvent may be employed provided it is inert under the conditions of the reaction and provided, of course, that it is a solvent for the reactants. Illustrative suitable solvents include: benzene, pyridine, quinoline, nitrobenzene, dimethyl aniline, Decalin and 1,1,2-trifluoro-1,2,2-trichloroethane.

In order to minimize reaction time, any of the well known esterification catalysts, such as pyridine, quinoline, trifluoroacetic acid, p-toluene sulfonic acid, phosphonic acid, sulfuric acid and cupric chloride may be employed. The amount of catalyst is not critical and may range from about 1.0 to 200% by weight based on the amount of alcohol reactant charged. When acrylyl or methacrylyl chloride is used, pyridine and quinoline are preferred catalysts since each, in sufficient amounts, acts as a solvent as well. Additionally, due to their low boiling points, pyridine and quinoline may be readily separated from the reaction product by simple distillation. If employed, the amount of pyridine or quinoline charged to the reaction mixture is generally about 0.10 to 2.00 parts, preferably 0.5 to 1.5 parts, per part alcohol reactant charged.

The reaction temperature may vary over a wide range, i.e., from below room temperature up to the boiling point of the reaction mixture. Normally a temperature selected from about room temperature to 100° C. is utilized with a mild agitation of the reaction mixture. When the anhydride form of acrylic acid is employed, the reaction mixture is preferably maintained at about room temperature, say between about 10–30° C. and still preferably below about room temperature.

The esterification reaction is preferably run in the presence of a small amount of a conventional polymerization inhibitor, such as hydroquinone, α-pinene and p-tertiarybutyl catechol, in order to avoid undesirable premature polymerization which may take place to some extent, particularly at the more elevated temperatures.

Reaction times will depend upon the reactivity of the acrylic reactant chosen, the catalyst used, if any, and other variables, such as temperature. Substantial yields of product may be formed in a period from about 30 minutes to several hours.

Recovery and purification of the resulting ester products may be effected by employing conventional procedures, such as solvent extraction, a series of water washing steps followed by drying, or ordinary distillation.

The above procedures may be employed to prepare individual fluorinated acrylic monomers or mixtures of fluorinated acrylic monomers within the scope of the invention having dissimilar components. The latter situation will result when a mixture of alcohols is esterified rather than a single alcohol.

The alcohol starting materials for these reactions, and preparation thereof, are disclosed in our co-pending application Ser. No. 721,089, filed Apr. 12, 1968, the pertinent subject matter of which is hereby incorporated by reference, as well as in our co-pending parent application Ser. No. 633,359, filed Apr. 25, 1967, the pertinent subject matter of which is hereby incorporated by reference.

Essentially, the alcohols of Formula III may be prepared from the corresponding telomers of the formula

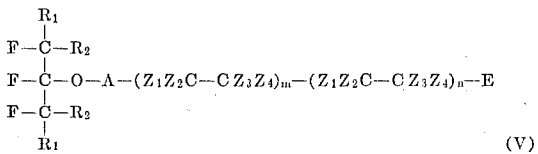

(V)

wherein $R_1$, $R_2$, $A$, $Z_1$, $Z_2$, $Z_3$, $Z_4$, $m$ and $n$ are as defined above and wherein E is bromine or iodine, except that the terminal carbon atom adjacent to the E atom is perhalogenated, by reaction with $SO_3$ to produce the corresponding acid halide, reducing the acid halide with an alkanol, at temperatures in the range of about 0–25° C. to form the corresponding ester, followed by reduction of the ester with a mild reducing agent such as $LiAlH_4$ in ether to form the desired alcohol. Preferably, $m$ and $n$ are integers from 1–40 and still preferably from 1–7.

Another generalized route to these alcohols is to react the corresponding telomer, as described above except that the terminal carbon atom adjacent to the E atom contains one or more hydrogen atoms, an alkyl group, an alkylene group, a haloalkyl group or a haloalkylene group, with $SO_3$ to form the corresponding polysulfates, followed by hydrolysis of the polysulfate with 35–50% $H_2SO_4$ at about 100° C. to the desired alcohol. A more detailed description of these polysulfates as well as their hydrolysis to the corresponding alcohols may be found in co-pending application of Anello et al., Ser. No. 633,368, filed Apr. 25, 1967, mentioned supra. As described in co-pending application Ser. No. 633,368, these polysulfates may be converted directly to the novel acrylic monomers of the invention by direct reaction with acrylic acid or methacrylic acid.

The telomer starting materials for these reactions, and preparation thereof, are disclosed in our co-pending parent application Ser. No. 633,359, filed Apr. 25, 1967, the pertinent subject matter of which is hereby incorporated by reference. Essentially, these telomer starting materials may be prepared by telomerizing corresponding telogens of the formula

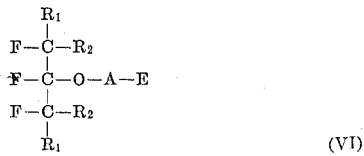

(VI)

wherein $R_1$, $R_2$ and $A$ are as indicated above and wherein E is selected from the group consisting of iodine and bromine. When E is bromine, there may not be any other bromine substituents in the molecule. The reaction of the telogens of Formula VI with a suitable telomerizable unsaturated material will give repeating units of the radical $—(Z_1Z_2C—CZ_3Z_4)—$ in the molecule.

The telomerization reaction is carried out under free radical conditions. The free radicals are preferably produced by thermal initiation of the reaction and this is accomplished simply by heating the reactants to an elevated temperature. The reacton conditions normally will vary to some extent, depending on the particular reactants and the type of product desired. The temperature should normally be between about 100° C. and 350° C., preferably between about 150–200° C. Furthermore, although the reaction may be conducted at atmospheric pressure, superatmospheric pressures, for example, up to about 20,000 p.s.i.g. may be used with pressures between about 100 p.s.i.g. and about 10,000 p.s.i.g. being especially preferred. The reaction time is whatever is required to give satisfactory conversions and the optimum reaction time will depend on the particular reactants employed, on the temperature and on the method of unsaturated compound addition. For example, if the telogen and unsaturated compound are charged initially and heated to a temperature of about 200° C., the reaction is substantially complete in about 3 hours. On the other hand, if portionwise or continuous addition of tetrafluoroethylene is used, for example, the reaction time is dependent on temperature and the rate of unsaturated compound addition. It is additionally believed that the chain length of the product obtained is influenced by the reaction time at least to a certain extent. Normally, the reaction time may range from about 10 minutes to about 2 weeks, usually from about 1 hour, to about 48 hours.

If desired, the telomerization reaction may be conducted by use of a catalyst or light of sufficient intensity to initiate the free radical reaction. Illustrative free radical generating catalysts include azonitriles such as alpha, alpha'-azobisisobutyronitrile and organic peroxides such as benzoyl peroxide, acetyl peroxide and pelargonyl peroxide. The use of such initiators allows operation at a lower temperature but gives a somewhat more complex product mixture because of incorporation of catalyst fragments in the telomer mixture, or results in a higher molecular weight distribution in the telomer product.

The telomerization reaction may be carried out in various ways. For example, the telogen and the unsaturated compound may be introduced into an autoclave which is then sealed and heated, preferably with agitation such as by stirring or shaking, until the pressure drop indicates that the reaction has proceeded to the desired extent. In such an operation, the molar ratio of unsaturated compound to telogen is of importance in determining the molecular weight of the telomer product. In general, the average molecular weight of the product is dependent upon the molar ratio of unsaturated compound to telogen; the higher the unsaturated compound: telogen molar ratio, the higher will be the average molecular weight of the telomer product. The ratio of telogen to unsaturated compound may vary from about 1:75 to as high as 200:1, the preferred ratio for batchwise operation being about 1:1 to 2:1 in the production of relatively low molecular weight telomers, i.e. telomers containing up to about 6 or 7 monomer units per telomer molecule. On the other hand, in a constant pressure reaction, i.e. where a constant pressure of unsaturated compound is maintained above the liquid phase comprising the telogen during the reaction, the molecular weight of telomer product may be controlled by varying the pressure of the unsaturated compound. In general, the higher the pressure of the unsaturated compound, the higher the molecular weight of the telomer product.

The telomerization reaction inherently produces a mixture of telomers of varying chain lengths and corresponding varying molecular weights. The average chain length and the spread of molecular weight produced by the telomerization reaction may be controlled within limits as discussed above by varying the reactant proportions, reaction time, reaction temperature, reaction pressure and other reaction variables. If desired, individual telomer products can be separated from mixtures thereof by conpentional separatory techniques, for example, by fractional distillation, fractional crystallization using an inert solvent such as diethyl ether, or the mixture of telomer products may be separated into fractions of narrower ranges of molecular weights having a desired viscosity or other properties.

The telogen starting materials may be prepared by reaction of an appropriate halogenated ketone with an ionizable fluoride salt to form a fluorinated organic salt and then reacting the organic salt with a halogen other than fluorine (e.g. iodine, bromine) and an appropriate olefin to form the desired telogen. This reaction is more fully described in co-pending applications of Litt et al., Ser. No. 492,276, filed Oct. 1, 1965, now U.S. Pat. 3,453,333, and Litt et al., Ser. No. 513,574, filed Dec. 13, 1965, now U.S. Pat. 3,470,256, the pertinent subject matter of which is hereby incorporated by reference. For example, as is described in Examples 1 and 3 of the former application, the telogen perfluoroisopropoxyethyl iodide,

$$(CF_3)_2CFOCF_2CF_2I$$

may be prepared by reacting hexafluoroacetone with potassium fluoride in an acetonitrile solvent to produce the corresponding addition compound having the formula $(CF_3)_2CFO^-K^+$ and thereafter reacting this addition compound with tetrafluoroethylene and iodine in the presence of an inert organic solvent to form the desired perfluoroisopropoxyethyl iodide, $(CF_3)_2CFOCF_2CF_2I$.

Telomers according to Formula V wherein $n$ is 0 may be obtained by telomerizing at reaction conditions more particularly defined hereafter, a telogen of Formula VI with a telomerizable unsaturated compound. The telomerizable unsaturated compound may be the same or different from that used as reactant with the fluorinated organic salt and halogen in preparation of the telogen starting materials. Telomers according to Formula V wherein both $m$ and $n$ are 1 or over, may be obtained by reacting a suitable telogen with a first telomerizable unsaturated material to form a telomer and then reacting the telomer thus produced with a second telomerizable unsaturated material which may be the same or different as the first telomerizable unsaturated material. The telomerizable unsaturated compound may not contain bromine if the E atom in the telogen is bromine.

As can be seen from the above description, the telomers produced can serve as telogens for further reactions. The term telogen will be used in this sense herein. In other words, the telogen may be a telomer product produced from a telogen, which telomer produced is further telomerizable.

The novel polymeric products according to the invention containing the recurring units as shown in Formula II above may be homopolymers, in which case the indicated recurring units are the only ones present; copolymers, in which case these recurring units are interspersed with units derived from one another polymerized unsaturated monomer; or heteropolymers, such as terpolymers, in which there are more than two distinct types of recurring units interspersed in the molecule.

The polymerization reaction may be carried out by any conventional method such as solution polymerization, bulk polymerization, emulsion polymerization or suspension polymerization. Bulk polymerization may be carried out in the presence of light or a free radical generating catalyst as initiator. Solution polymerization can be carried out employing a suitable solvent such as trifluoroethyl trifluoroacetate or a halogen containing hydrocarbon such as 1,1,2 trichlorotrifluoroethane and 1,3-bis(trifluoromethyl)benzene, and a catalyst such as a peroxide as initiator.

The preferred method of polymerization is in aqueous emulsion. The polymer is normally obtained as a latex or as a mixture of coagulated polymer and latex. Emulsification can be effected by the addition of any one of a number of conventional anionic, non-ionic or cationic emulsifiers. These emulsifiers are well-known in the art and the particular emulsifier to be used is merely a question of choice. Examples of suitable emulsifiers include the following: sodium lauryl sulfate, the potassium salt of perfluorosulfonic acid, trimethyltetradecylammonium chloride, sodium lauryl sulfosuccinate and ethylene oxide condensates of alkyl phenols or alkyl amines.

The aqueous emulsion type polymerization as well as the other type polymerizations are preferably carried out in the presence of a catalyst or initiator which is an organic or inorganic free radical generator of the peroxide type. These catalysts are well-known in the art. Illustrative suitable peroxide catalysts for use in these polymerization procedures include, for example, benzoyl peroxide, lauryl peroxide, acetyl peroxide, succinyl peroxide, potassium persulfate, hydrogen peroxide, alpha, alpha' -azobisiso- butyronitrile, 2,2'-azodiisobutyramidine dihydrochloride, cumene hydro peroxide, and the like.

The polymerization recipes may include a variety of other additives as is conventional in the art. These may include for example, chain transfer agents such as carbon tetrachloride and mercaptans, cross-linking agents such as divinylbenzene and alkylene glycol dimethacrylates, water soluble organic solvents, such as ethylene glycol, ethyl alcohol and acetone, and inorganic salts such as chlorides, carbonates, acetates, phosphates and borates which serve as electrolytes and as buffers.

The polymerization reaction is generally carried out between about room temperature and about 100° C. The reaction time for the polymerization varies over a wide range and for the most part depends both upon the temperature employed, upon the nature of the monomers used and upon the nature of the initiator used. Normally, it can be expected that complete polymerization may be accomplished within a period of about 1–72 hours.

Polymerization can be recognized by observing the formation of a rubbery, or hard, tacky material or by observing coagulation or formation of an emulsion.

Suitable polymerizable monomers for preparation of the co- and hetero-polymers may be selected from any of the ethylenically unsaturated monomers which are well-known in the art. Of particular interest are those unsaturated monomers having a terminal ethylenic linkage. Illustrative specific types of ethylenically unsaturated monomers include the vinyl compounds, e.g. vinyl esters such as vinyl stearate, vinyl butyrate, vinyl acetate, and the like; vinyl halides, such as vinyl fluoride, vinyl chloride, vinylidene fluoride, tetrafluoroethylene, and the like; vinyl alkyl ketones, such as vinyl methyl ketone, and the like; vinyl alkyl sulfones, such as vinyl isopropyl sulfone, and the like; vinyl ethers such as methyl vinyl ether, and the like; n-vinyl pyrrolidone; olefinic compounds, such as ethylene, propylene, isobutylene, butadiene and isoprene; aromatic compounds containing olefinic unsaturated groups such as styrene, and α-methyl styrene; other acrylic compounds such as acrylic and methacrylic acids, and esters and amides, such as methyl acrylate, methyl methacrylate, butyl acrylate, 2-ethylhexyl acrylate, 2-ethylhexyl methacrylate, decyl acrylate, lauryl methacrylate, stearyl acrylate, hydroxyethyl acrylate, hydroxypropyl methacrylate, t-butylaminoethyl acrylate, N,N-diethylaminoethyl methacrylate, glycidyl acrylate, acrylamide, methacrylamide, N-methylol acrylamide, N-methylol methacrylamide, N-isopropyl acrylamide, and the like; other unsaturated acid esters, such as methyl crotonate, methyl maleate, diethyl fumarate, allyl acetate and allyl caprylate. Other suitable co-monomers include one or more dissimilar fluorinated acrylic monomers within the scope of the invention. Other polymerizable unsaturated co-monomers suitable for use will readily occur to those skilled in the art.

In the following and foregoing discussion of the invention it is intended that the term "acrylic" and the term "acrylate" be understood to comprehend "methacrylic" and "methacrylate."

The novel polymeric materials of the invention may be readily applied to substrates for the purpose of imparting oil, stain and water repellency properties thereto, by any of the techniques well-known to the art. For example, when the polymeric materials are prepared by bulk or suspension polymerization techniques, these materials may be applied directly from its solution in a suitable organic solvent. The organic solvent may be that which has been employed in the polymerization reaction. If the polymeric materials have been obtained as an aqueous emulsion, the coating may be applied by diluting the emulsion obtained from the polymerization reaction with water or other solvent to obtain a dispersion of polymer solids which can then be used to apply the coating to the desired substrate. The optimum solids content of the dispersion or solution of the polymer employed will vary depending upon the particular material involved, the particular substrate involved and other factors. Such determinations are within the skill of the art.

The polymer dispersion or solution may be applied as a coating to the desired substrate by conventional techniques such as by spraying, brushing or dipping procedures. The coated materials can then be dried to remove the water or other solvent dispersing medium.

The subject polymeric materials may be used to impart oil, stain and water repellent properties to a variety of porous materials such as textiles, fibers, fabrics of natural or synthetic origin, e.g. cotton cloth or nylon, as well as to a variety of non-porous substrates, such as paper, wood, metal and the like.

Under conditions of actual use, it will frequently be desirable to combine the active oil, stain and water repellent polymeric materials of the invention with other formulating components in order to achieve special purposes. For example, formulating components may be used as sizing agents, crease-proofing agents, extenders to minimize the overall cost of the final formulation which is to be used, water repellents, and the like. Some of these formulating components may, in combination with the active polymeric products of the invention, produce synergistic results with respect to oil and water repellency properties. Suitable extenders for use as formulating components include other polymeric materials which may be homopolymers or co-polymers derived from any of the polymerizable unsaturated materials mentioned above for use as co-monomers to obtain the co-polymers of the invention. Preferably, the polymers or co-polymers used for this purpose are derived from non-fluorinated polymerizable unsaturated materials such as alkyl acrylates and methacrylates, as illustrated by methyl acrylate, ethyl methacrylate, isopropyl acrylate, butyl methacrylate, 2-ethylhexyl acrylate, 2 - ethylhexyl methacrylate, 3,5,5-trimethylhexyl acrylate, lauryl methacrylate, cyclohexyl methacrylate, hydroxyethyl methacrylate, and the like. Other materials particularly suited for use for this purpose include polymers and co-polymers of N-methylol acrylamide, N-methylol methacrylamide, acrylonitrile and methacrylonitrile.

Other materials such as waxes and formaldehyde based condensation products may be used as formulating components to improve the durability characteristics of the finishes. It is to be understood that the particular mode of formulating the active polymeric materials of the invention and of applying these formulations to the desired substrates are not a part of the invention and are within the skill of the art.

DESCRIPTION OF THE PREFERRED EMBODIMENTS

A preferred class of fluorinated acrylates within the scope of the invention are those which have the formula

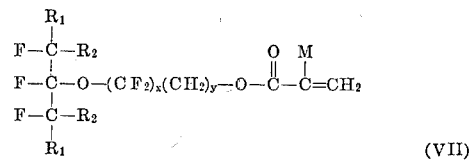

(VII)

wherein $R_1$ and $R_2$ are perhaloalkyl groups having from 1–19 carbon atoms in which all the halogen atoms are selected from the group consisting of chlorine and fluorine with the proviso that at least one fluorine atom is attached to each carbon atom of the $R_1$ and $R_2$ groups, M is H or $CH_3$, and $x$ and $y$ are integers from 1–20 inclusive and may be the same or different.

A more preferred class of fluorinated acrylates according to Formula VII are those in which the sum of $x$ and $y$ is no greater than 16.

Another preferred class of fluorinated acrylates is that in which $R_1$ and $R_2$ in above Formula VII are perfluoroalkyl groups or F, and the value of $y$ is at least equal to 2.

If $R_1$ and $R_2$ are perfluoroalkyl groups, these groups preferably contain 1–2 carbon atoms. When the $R_1$ and $R_2$ groups contain halogen substitution, other than fluorine, or hydrogen substitution, it is preferred that enough fluorine substitution be provided so that the atomic ratio of fluorine to the other halogen atoms, to the hydrogen atoms or to the combined total of the other halogen atoms and hydrogen atoms, is at least 1:1.

In a more preferred embodiment within the scope of the preferred fluorinated acrylates of Formula VII above, $R_1$ and $R_2$ are both F. A more preferred embodiment of the preferred fluorinated acrylates of Formula VII is that in which, in combination, $R_1$ and $R_2$ are F and in which $y$ is at least 2. In other embodiments, preferred fluorinated acrylates according to Formula VII are those in which $x$ is any integer from 1–10 and $y$ is 1; wherein $x$ is an even number from 2–10; wherein $x$ is an even number from 2–10 and $y$ is an odd or even number from 3–10; wherein $x$ is an even number from 2–10 and $y$ is 2–3; wherein $x$ is an odd number from 1–10 and $y$ is an even or odd number from 4–10; and those embodiments wherein the sum of $x$ and $y$ does not exceed 10.

The preferred routes to the alcohol precursors of the fluorinated acrylates of Formula VII will vary depending upon whether the values of $x$ and $y$ are to be odd or even and upon the length of the various $CF_2$ and $CH_2$ chains. For example, when $x$ is an even number and $y$ is an odd or even number from 3 to 20, the alcohol may be produced by reduction of the corresponding iodo alcohol with lithium aluminum hydride or with zinc and alcohol. The production of such iodo alcohols may be effected by reacting a haloisopropoxyfluoroalkyl iodide having "$x$" $CF_2$ groups in the alkyl chain with an unsaturated alcohol. Other means for preparing such iodo alcohols will readily occur to those skilled in the art.

When "$x$" is an odd number from 1–19 and $y$ is an odd or even number from 4–19, the alcohols may be prepared by reacting a polyhaloisoalkoxy acid having an odd number of $CF_2$ groups in the fluoroalkane chain with $Ag_2O$ to form the silver salt; reacting the silver salt with iodine to form the polyhaloisoalkoxy perfluoroalkyl iodide, then reacting the polyhaloisoalkoxy perfluoro-alkyl iodide with an unsaturated alcohol, such as allyl alcohol, and finally removing the iodine such as with zinc and alcohol.

When $x$ is an even number from 2–20 and $y$ is 2–3, the alcohols can be made by converting the appropriate iodide to the pyrosulfate with sulfur trioxide or to the hydrosulfate with oleum and hydrolyzing the polyfluoroisoalkoxyalkyl sulfate or hydrogen sulfate to the alcohol with aqueous acid.

The above preferred methods for making the preferred alcohol precursors as described above are described in more detail in our co-pending application Ser. No. 721,089, filed Apr. 12, 1968, mentioned supra, the pertinent subject matter of which is hereby incorporated by reference.

Specific examples of embodiments of the novel fluorinated acrylates of the invention as defined both by Formulas I and VII include the following:

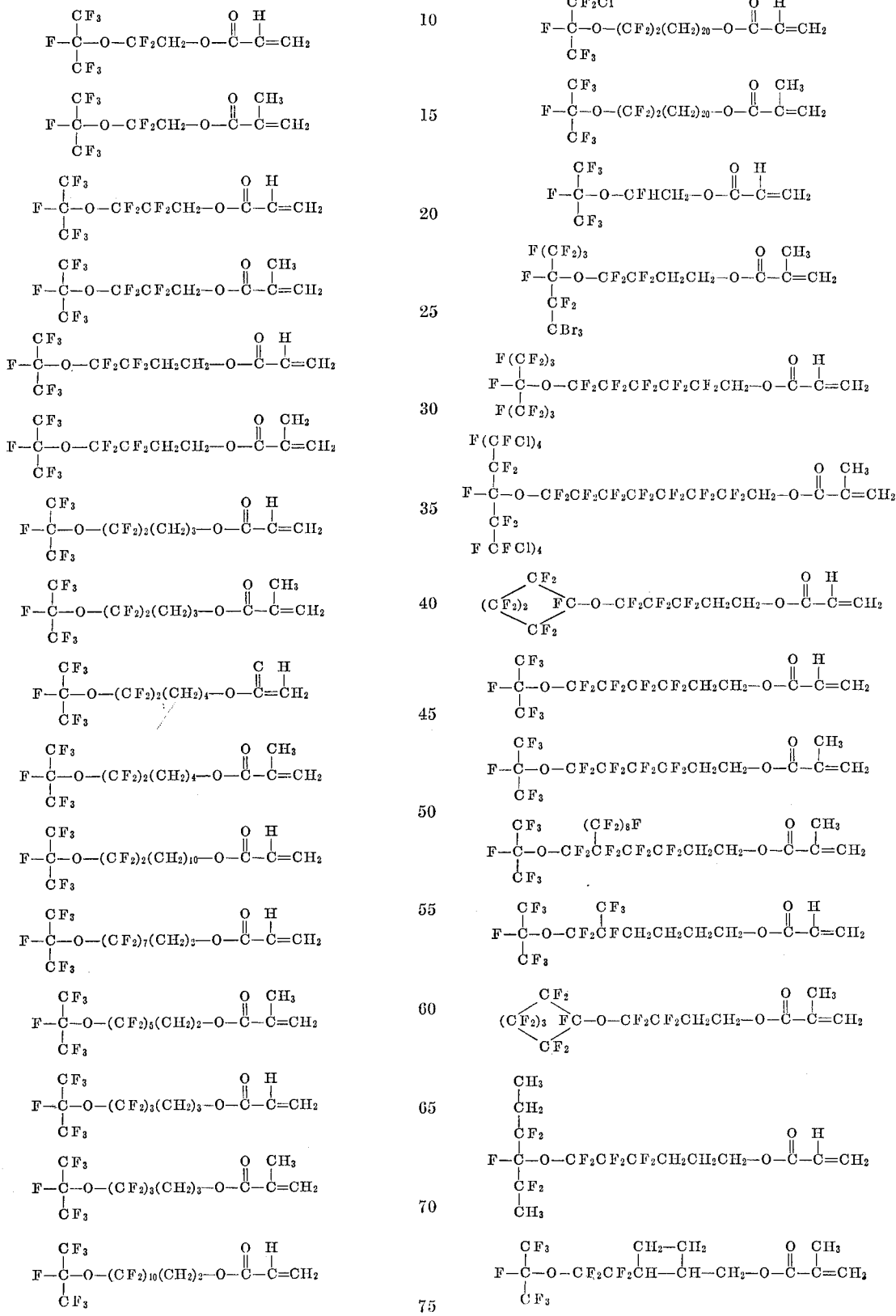

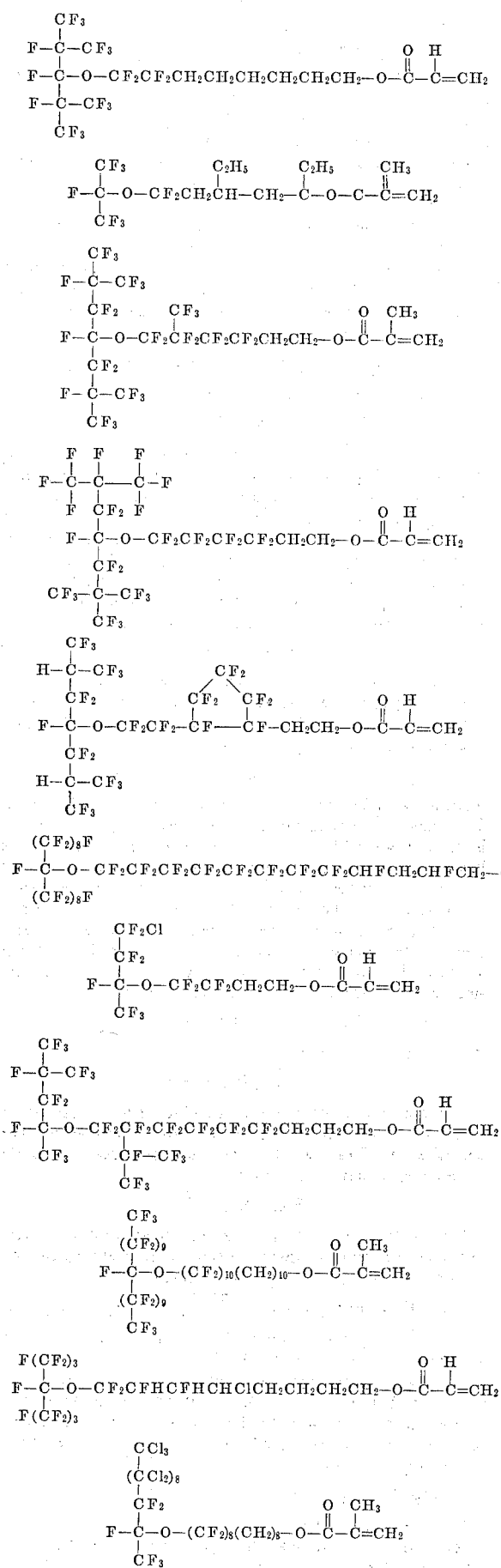

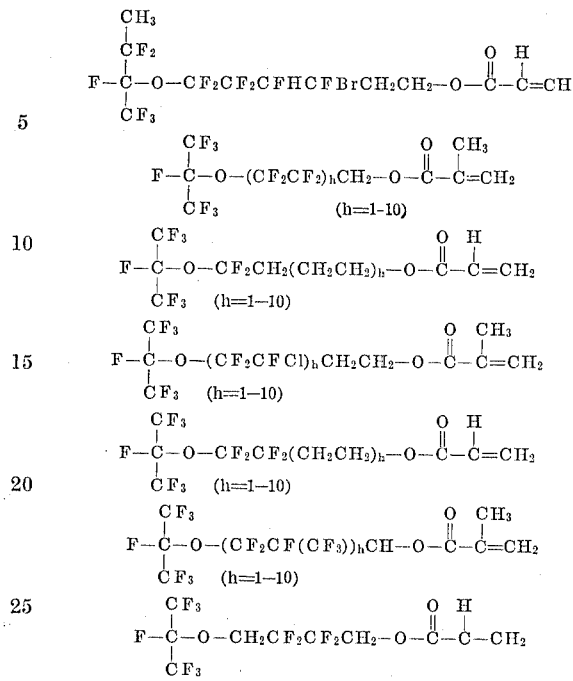

Preferred polyacrylic materials within the scope of the invention which are prepared from the preferred fluorinated acrylic monomers of the invention as shown by Formula VII will have recurring units of the formula

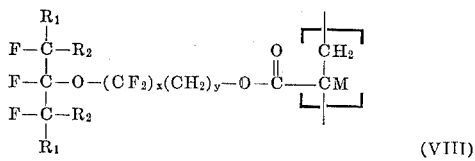

(VIII)

wherein $R_1$, $R_2$, $x$, $y$, and $M$ are as defined above.

Preferred co-monomers for use in preparing preferred co- or ter-polymers of the invention include the following: methyl acrylate, methyl methacrylate, ethyl acrylate, methacrylic acid, 2-ethylhexyl acrylate, hydroxyethyl methacrylate, dimethyl aminoethyl methacrylate, 2-ethylhexyl methacrylate, 2-methylhexyl acrylate, N-methylol acrylamide, hydroxylpropyl methacrylate, butyl acrylate, butyl methacrylate, t-butyl aminoethyl methacrylate, n-octyl acrylate, n-octyl methacrylate, isodecyl acrylate, isodecyl methacrylate, glycidyl acrylate, glycidyl methacrylate, ethylene acrylate and ethylene methacrylate.

Preferred monomeric fluorinated acrylates within the scope of the invention for homopolymerization or interpolymerization with one another include $(CF_3)_2CFOCF_2CF_2CH_2CH_2OCOC(CH_3)=CH_2$
$(CF_3)_2CFOCF_2CF_2CF_2CF_2CH_2CH_2OCOC(CH_3)=CH_2$ and $(CF_3)_2CFOCF_2CF_2-$
   $(CF_2CF_2)_2CH_2CH_2OCOC(CH_3)=CH_2$ Illustrative inter-polymers within the scope of the invention include the following:

50% $(CF_3)_2CFOCF_2CH_2CH_2CH_2OCOC(CH_3)=CH_2$

50% $(CF_3)_2CFOCF_2$
   $CF_2CF_2CF_2CH_2CH_2OCOC(CH_3)=CH_2$ (1)

25–50% $(CF_3)_2CFOCF_2CF_2CH_2CH_2OCOC(CH_3)=CH_2$

25–50%
(CF$_3$)$_2$CFOCF$_2$CF$_2$CF$_2$CF$_2$CH$_2$CH$_2$OCOC(CH$_3$)=CH$_2$

25–33⅓% (CF$_3$)$_2$
CFOCF$_2$CF$_2$(CF$_2$CF$_2$)$_2$CH$_2$CH$_2$OCOC(CH$_3$)=CH$_2$     (2)

Illustrative extenders which may be used for physical incorporation with a polymeric material within the scope of the invention include the following: homopolymer of n-octyl methacrylate, homopolymer of n-butyl acrylate, homopolymer of isodecyl methacrylate, co-polymer of n-octyl methacrylate with N-methylol acrylamide, co-polymer of n-stearyl methacrylate with N-methylol acrylamide, co-polymer of n-butyl methacrylate with N-methylol acrylamide, co-polymer of ethyl acrylate with N-methylol acrylamide, co-polymer of methyl methacrylate with N-methylol acrylamide, co-polymer of n-lauryl methacrylate with N-methylol acrylamide, co-polymer of n-lauryl methacrylate with hydroxypropyl methacrylate, co-polymer of n-lauryl methacrylate with methyl methacrylate, co-polymer of n-lauryl methacrylate with dimethyl aminoethyl methacrylate, co-polymer of 2-ethylhexyl methacrylate with N-methylol acrylamide, co-polymer of isodecyl methacrylate with N-methylol acrylamide, co-polymer of isodecyl methacrylate with hydroxypropyl methacrylate, co-polymer of isodecyl methacrylate with hydroxyethyl methacrylate, co-polymer of isodecyl methacrylate with n-butyl acrylate with N-methylol acrylamide co-polymer of isodecyl methacrylate with methyl methacrylate with N-methylol acrylamide, co-polymer of isodecyl methacrylate with n-butyl methacrylate with N-methylol acrylamide, co-polymer of ethyl methacrylate with N-methylol acrylamide, co-polymer of isobutyl methacrylate with N-methylol acrylamide and co-polymer of isodecyl methacrylate with N-methylol acrylamide with ethylene glycol dimethacrylate.

The following examples provide a further description of the invention, it being understood that these examples are given for purposes of illustration only and are not to be regarded as restricting the scope of the invention which is defined by the appended claims. Parts are by weight except as otherwise noted.

EXAMPLE 1

Into a reaction vessel equipped with a stirrer, reflux condenser and thermometer, there were placed 51 grams of bis(1,1,2,2 - tetrahydrooctafluoro-6-heptafluoroisopropoxyhexyl) pyrosulfate and 15 grams of acrylic acid. The mixture was then heated to 105° C. for a period of 24 hours during which period two liquid phases formed in the reaction vessel. The liquid contents of the reaction vessel were cooled to room temperature and the two liquid phases were separated. The lower water-insoluble phase (45 grams) was distilled to yield 38 grams (70%) of 1,1, 2,2 - tetrahydrooctafluoro - 6-heptafluoroisopropoxyhexyl acrylate having the structural formula (CF$_3$)$_2$CFOCF$_2$CF$_2$CF$_2$CF$_2$CH$_2$CH$_2$—O—C(=O)—CH=CH$_2$ boiling point 48–51° C./1.5 mm.

EXAMPLE 2

Into a 100 ml. 3-neck flask were placed 10 grams of (CF$_3$)$_2$CFOCF$_2$CF$_2$CF$_2$CF$_2$CH$_2$CH$_2$OCOCH=CH$_2$ 60 grams of deionized water, 6 grams of a 24% aqueous solution of cetyl dimethyl ammonium acetate and 0.3 gram of 2,2′-azobisisobutyramidine hydrochloride. The reaction flask was flushed with nitrogen and the reaction mixture was heated to 60° C. and maintained at that temperature for a period of 6 hours. Polymerization took place yielding a stable aqueous emulsion of polymer.

EXAMPLE 3

Into a 1-neck 50 ml. flask equipped with a stirrer, reflux condenser and thermometer, were placed 17 grams (0.052 mole) of 3,3,4,4-tetrafluoro-4-(heptafluoroisopropoxy)-1-butanol, (CF$_3$)$_2$CFOCF$_2$CF$_2$CH$_2$CH$_2$OH, 0.09 gram hydroquinone and 12 grams (0.13 mole) of acrylyl chloride, CH$_2$=CHCOCl. About 0.1 gram of CuCl$_2$ was added as catalyst. The mixture was slowly heated at 30° C. HCl was evolved and heating was stopped. Over a period of 1 hour the temperature of the mixture was raised to 40° C. and then to 75° C. over a period of 3 hours. The reaction mixture was then cooled and the product distilled on a spinning band column. The excess acrylyl chloride was flashed off and the remainder was distilled, yielding 13 grams of (CF$_3$)$_2$CFOCF$_2$CF$_2$CH$_2$CH$_2$OCOCH=CH$_2$ corresponding to a yield of 65.3%.

EXAMPLE 4

Into a 100 ml. 3-neck flask were placed 2.5 grams of (CF$_3$)$_2$CFOCF$_2$CF$_2$CH$_2$CH$_2$OCOCH=CH$_2$ with 20 grams of deionized water, 0.17 gram of 30% H$_2$O$_2$ solution and 0.9 gram of emulsifier (prepared by mixing 6 parts of cetyl dimethyl amine, 2 parts of glacial acetic acid and 24 parts of water). The reaction flask was flushed with nitrogen. The temperature of the reaction mixture was raised to 55° C. and within 4 hours polymerization took place yielding a stable emulsion of polymer.

EXAMPLE 5

Into a 250 ml., 3-neck flask equipped with stirrer, thermometer, reflux condense and Dean-Stark tube were placed 68 grams (0.207 mole) of 3,3,4,4-tetrafluoro-4-(heptafluoroisopropoxy)-1-butanol, (CF$_3$)CFOCF$_2$CF$_2$CH$_2$CH$_2$OH together with 18 grams (0.210 mole) of methacrylic acid, 0.7 gram of concentrated (96%) H$_2$SO$_4$. 2 grams of hydroquinone and 150 ml. of benzene. This mixture was heated with stirring to reflux. After about 6 hours, 2.9 grams (0.16 mole) of water had collected in the Dean-Stark tube and the remaining material was transferred to a distillation flask. The benzene was flashed off and there were recovered 4 grams of (0.012 mole) of the starting alcohol and 67 grams (0.17 mole, 82% conversion, 88% yield) of the methacrylate ester (CFO$_3$)$_2$CFOCF$_2$CF$_2$CH$_2$CH$_2$OCOC(CH)$_3$=CH$_2$ B.P. 61–63° C./4 mm.

EXAMPLE 6

Polymerization of the methacrylate ester obtained in Example 5 was carried out in a manner similar to that described in Example 4 above and produced a stable aqueous emulsion of polymer.

EXAMPLE 7

Into a 100 ml. 3-neck flask equipped with a stirrer, reflux condenser and thermometer, there were placed 46 grams (0.038 mole) of the pyrosulfate

[(CF$_3$)$_2$CFOCF$_2$CF$_2$(CF$_2$CF$_2$)$_2$CH$_2$CH$_2$OSO$_2$]$_2$O 1.0 gram of hydroquinone and 15 grams (0.20 mole) of acrylic acid, CH$_2$=CHCOOH. The resulting mixture was heated to a temperature between 100–110° C. and maintained at that level for a period of 15 hours. After this period the mixture was distilled on a distilling band column. There were recovered 19 grams (0.023 mole, 42% conversion, 79% yield) of (CF$_3$)$_2$CFOCF$_2$CF$_2$(CF$_2$CF$_2$)$_2$CH$_2$CH$_2$OCOCH=CH$_2$ B.P. 82–83° C./2 mm.

*Analysis.*—Calculated for C$_{14}$F$_{19}$H$_7$O$_3$ (percent): C, 28.77; F, 61.81; H, 1.20. Found (percent): C, 29.34; F, 62.71; H, 1.05.

EXAMPLE 8

Into a 100 ml. 3-neck flask were placed 2.8 grams of 1,1,2,2 - tetrahydrododecafluoro - 8 - heptafluoroisopropyoxyoctyl acrylate, 20 grams of deionized water, 1.8 grams of an emulsifier (prepared by mixing 6 parts cetyl dimethyl amine, 2 parts of glacial acetic acid and 24 parts water), and 0.6 gram of 30% $H_2O_2$ solution. The mixture was flushed with nitrogen and heated to 55° C. for a period of 6 hours. At the end of this period a charge of 0.09 gram of sodium lauryl sulfate and 0.05 gram of $K_2S_2O_8$ was added and heating was continued for 2 additional hours. The resulting solid polymer mass was further coagulated with methanol, dried under vacuum and dissolved in 1,3-bis(trifluoroethyl)benzene.

EXAMPLE 9

Into a 100 ml. 3-neck flask equipped with a stirrer, reflux condenser and thermometer there were placed 31 grams (0.057 mole) of $(CF_3)_2CFOCF_2CF_2CF_2CF_2CH_2CH_2I$ 20 grams (0.10 mole) of $AgOCOC(CH_3)=CH_2$ and 40 grams of $CH_2=C(CH_3)COOH$. The mixture was heated to 100° C. and maintained at that temperature for a period of 16 hours. At the end of this period the reaction mixture was washed with water, dried and distilled. There were recovered 12.5 grams (0.025 mole, 44% yield) of $(CF_3)_2CFOCF_2CF_2CF_2CF_2CH_2CH_2OCOC(CH_3)=CH_2$ B.P. 69–70°./1.5 mm.

Calculated for $C_{13}F_{15}H_9O_3$ (percent): C, 31.35; F, 57.25; H, 1.81. Found (percent): C, 32.10; F, 56.94; H, 1.72.

EXAMPLE 10

Into a 100 ml. 3- neck flask were placed 38 grams of $(CF_3)_2CFOCF_2CF_2CF_2CF_2CH_2CH_2OCOC(CH_3)=CH_2$ 20 grams of deionized water, 0.2 gram of 30% $H_2O_2$ solution and 9.9 grams of an emulsifier prepared by mixing 6 parts of cetyl dimethyl amine, 2 parts of glacial acetic acid and 24 parts of water. The reaction mixture was flushed with nitrogen and heated to 55°. After 6 hours about 0.5 grams of $K_2S_2O_8$ and 0.5 gram of sodium lauryl sulfate were added following which polymerization occurred within ½ hour. A granular polymer was obtained. This polymer was coagulated with methanol, dried under vacuum and dissolved in 1,3-bis(trifluoromethyl) benzene.

EXAMPLE 11

Into a 250 ml. 3-neck flask were placed 124 grams (0.23 mole) of $(CF_3)_2CFOCF_2CF_2(CF_2CF_2)_2CH_2CH_2OH$ 75 grams (0.75 mole) of methyl methacrylate, 4.0 grams of conc. $H_2SO_4$ and 1.0 gram of phenothiazine. The flask containing the mixture was fitted to a distillation column topped by a fractionation head. The mixture in the flask was then agitated and heated to 100° C. The reflux ratio was adjusted so that the head temperature did not exceed 90° C. The composition of the distillate (methanol and methyl methacrylate) and reaction mixture was followed by gas chromatography. Conversion was 87.5% in 6-7 hours. The reaction mixture was further distilled to remove unreacted methyl methacrylate and methanol by-product. There were recovered 110 grams (0.17 mole) of $(CF_3)_2CFOCF_2CF_2(CF_2CF_2)_2$
$CH_2CH_2OCOC(CH_3)=CH_2$ B.P./63° C./1 mm. A 73% yield of this product was obtained.

*Analysis.*—Calculated for $C_{15}F_{19}H_9O_3$ (percent): C, 30.11; F, 60.36: H, 1.50. Found (percent): C, 31.12; F, 61.17; H, 1.74.

EXAMPLE 12

Into a 100 mol. 3-neck flask were placed 10 grams of $(CF_3)_2CFOCF_2CF_2(CF_2CF_2)_2$
$CH_2CH_2OCOC(CH_3)=CH_2$ 55 grams of deionized water, 7.5 grams of acetone, 6 grams of cetyl dimethyl ammonium acetate and 0.15 gram of potassium persulfate. The mixture was flushed with nitrogen and heated to 55° C. and maintained at that temperature for a period of 5 hours. Polymerization took place yielding a stable aqueous emulsion containing 10.5% solids by weight of polymer. Conversion was 71%.

EXAMPLE 13

A 100 ml. 3-neck flask was charged with 4.0 grams of $(CF_3)_2CFOCF_2CF_2CH_2CH_2OCOCH=CH_2$ 4.0 grams of $(CF_3)_2CFOCF_2CF_2CF_2CF_2CH_2CH_2OCOCH=CH_2$ 2.0 grams

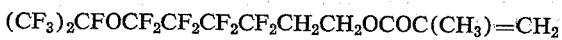
$(CF_3)_2CFOCF_2CF_2(CF_2CF_2)_2CH_2CH_2OCOCH=CH_2$ 30 grams of deionized water, 2.0 grams of cetyl dimethyl ammonium acetate (prepared by mixing 5 parts of cetyl dimethyl amine, 2 parts of glacial acetic acid and 24 parts water) and 2.0 grams of 30% $H_2O_2$ solution. The flask contents were heated to 55° C. with a nitrogen bleed for 6 hours. At the end of this period about 0.1 gram of lauroyl peroxide was added. Polymerization took place within one hour. A latex emulsion together with a quantity of coagulum was obtained. The coagulum was separated from the latex emulsion, further coagulated with methanol, dried under vacuum and dissolved in 1,3-bis (trifluoromethyl)benzene.

EXAMPLE 14

Into a 100 ml. 3-neck flask were placed 1.35 grams of $(CF_3)_2CFOCF_2CF_2CH_2CH_2OCOCH=CH_2$, 5.5 grams of deionized water, 0.59 gram of emulsifier (prepared by mixing 6 parts of cetyl dimethyl amine, 2 parts of glacial acetic acid and 24 parts water), 0.31 gram of a 60% aqueous solution of N-methylol acrylamide and 0.11 gram of 30% $H_2O_2$ solution. The mixture was flushed with nitrogen and heated to 55° C. Polymerization took place after 2 hours and a stable aqueous emulsion was obtained.

EXAMPLE 15

Into a 100 ml. 3-neck flask were placed 6.5 grams of $(CF_3)_2CFOCF_2CF_2CH_2CH_2OCOC(CH_3)=CH_2$ 0.325 gram of methyl methacrylate, 1.8 grams of cetyl dimethyl ammonium acetate and 0.8 gram of 30% $H_2O_2$ solution. The reaction mixture was heated to 55° C. for a period of 4 hours. A stable aqueous emulsion of polymer was obtained.

EXAMPLE 16

Into a 200 ml. 3-neck flask were placed 6.25 grams of $(CF_3)_2CFOCF_2CF_2CH_2CH_2OCOCH=CH_2$, 0.325 gram of 2-ethylhexyl acrylate, 50 grams of deionized water, 1.8 grams of cetyl dimethyl ammonium acetate and 0.8 gram of a 30% $H_2O_2$ solution. The reaction mixture was flushed with nitrogen and heated to 55° C. for a period of 3 hours. A stable emulsion of polymer was obtained.

EXAMPLE 17

38 grams of

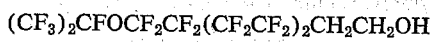
$(CF_3)_2CFOCF_2CF_2CH_2CH_2OCOC(CH_3)=CH_2$ and 2 grams of $HOCH_2CH_2CH_2OCOC(CH_3)=CH_2$ were dissolved in a mixture of 95 grams of $CFCl_2CFCl_2$ and 35 grams of $CFCl_2CF_2Cl$. The resulting solution was purged for one hour with nitrogen and then heated to reflux temperature under a blanket of nitrogen. Three equal portions of α,α'-azobisisobutyronitrile initiator totaling 0.15 gram were added to the solution, with 3 hour intervals between additions. During the addition of initiator the solution was agitated at 74° C. After completion of the addition of the initiator, heating of the solution was continued to maintain the temperature thereof between 76–78° C. The total time during which the solution was heated, including the period during which the initiator was added, was 12 hours. At the end of this period a small weighed sample of the solution was removed, the solvent was evaporated under reduced pressure and the solid polymer which was contained therein was isolated and weighed. It was determined that a quantitative conversion of monomer to polymer was obtained. The polymeric product had a composition which corresponded to the ratio of monomers charged.

Analysis showed: C, 52.9%; F, 31.5%; H, 2.60%.

EXAMPLE 18

Following the procedure of Example 17, a mixture of 38 grams of $(CF_3)_2CFOCF_2CF_2CH_2CH_2OCOC(CH_3)=CH_2$ and 12 grams of $CH_3(CH_2)_3OCOC(CH_3)=CH_2$ was dissolved in a mixture of 95 grams of $CFCl_2CFCl_2$ and 35 grams of $CFCl_2CF_2Cl$. Polymerization was carried out as described in Example 17. The polymeric product analyzed: C, 41.3%; F, 40.0%; H, 4.40%.

EXAMPLE 19

Following the procedure of Example 17, a mixture of 38 grams of $(CF_3)_2CFOCF_2CF_2CH_2CH_2OCOC(CH_3)=CH_2$ and 12 grams of $HN-C(CH_3)_3-CH_2CH_2OCOC(CH_3)=CH_2$ was dissolved in a mixture of 95 grams of $CFCl_2CFCl_2$ and 35 grams of $CF_2ClCFCl_2$. Polymerization was carried out as described in Example 17. Analysis of the product demonstrated that the composition was consistent with the ratio of the monomers charged.

EXAMPLE 20

Into a 100 ml. 3-neck flask were placed 6.5 grams of $(CF_3)_2CFOCF_2CF_2CH_2CH_2OCOC(CH_3)=CH_2$, 0.325 gram of methyl methacrylate, 1.8 grams of cetyl dimethyl ammonium acetate (prepared by mixing 6 parts of cetyl dimethyl amine, 2 parts of glacial acetic acid and 24 parts of water) and 0.8 gram of 30% $H_2O_2$. The resulting mixture was heated to 55° C. and maintained at that temperature for a period of four hours. Polymerization took place as evidenced by formation of a stable aqueous emulsion.

EXAMPLE 21

Into a 200 ml. 3-neck flask were placed 6.25 grams of $(CF_3)_2CFOCF_2CF_2CH_2CH_2OCOC(CH_3)=CH_2$, 0.325 gram of 2-ethylhexyl acrylate, 50 grams of deionized water, 1.8 grams of cetyl dimethyl ammonium acetate (prepared by mixing 6 parts of cetyl dimethyl amine, 2 parts of glacial acetic acid and 24 parts of water) and 0.8 grams of 30% $H_2O_2$. The resulting mixture was flushed with nitrogen and heated to 55° C. and maintained at that temperature for a period of 3 hours. Polymerization took place as evidenced by formation of a stable aqueous emulsion.

EXAMPLE 22

A reaction vessel was charged with 146.2 parts of $(CF_3)_2CFOCF_2CF_2CH_2CH_2OCOC(CH_3)=CH_2$, 3 parts of butyl acrylate, 1.25 parts of a 60% aqueous solution of N-methylol acrylamide, 598 parts of deionized water, 210 parts of acetone, 40.7 parts of cetyl dimethyl ammonium acetate (prepared by mixing 6 parts of cetyl dimethyl amine, 2 parts of glacial acetic acid and 24 parts of water). The resulting mixture was purged with nitrogen and heated to 55° C. At this point 1.13 grams of $K_2S_2O_8$ were added and the reaction mixture was maintained at 55° C. for a period of 4 hours. Polymerization took place during this period and the resulting polymer solution contained 15% solids.

EXAMPLE 23

A reaction vessel was charged with 36 parts of $(CF_3)_2CFOCF_2CF_2CH_2CH_2OCOC(CH_3)=CH_2$ 4 parts of dimethyl aminoethly methacrylate, 175 parts of deionized water, 25 parts of acetone and 9.75 parts of a 24% aqueous solution of cetyl dimethyl ammonium acetate (prepared by mixing 6 parts of cetyl dimethyl amine, 2 parts of glacial acetic acid and 24 parts of water). The reaction mixture was purged with nitrogen and heated to 55° C. At this point 0.27 gram of $K_2S_2O_8$ was added and the temperature of the reaction mixture was held at 55° C. for a period of 4 hours. At the end of this period another 0.27 gram of $K_2S_2O_8$ was added and the reaction mixture was maintained at the 55° C. temperature level for another 4 hours. At the end of the second period it was observed that polymerization had taken place resulting in a polymeric solution containing 13.2% solids.

EXAMPLE 24

A reaction vessel was charged with 146.2 parts of $(CF_3)_2CFOCF_2CF_2CH_2CH_2OCOC(CH_3)=CH_2$. 3 parts of butyl acrylate, 598 parts of deionized water, 210 parts of acetone and 40.7 parts of a 24% aqueous solution of cetyl dimethyl ammonium acetate (prepared by mixing 6 parts of cetyl dimethyl amine, 2 parts of glacial acetic acid and 24 parts of water). The reaction mixture was purged with nitrogen and heated to 55° C. At this point 1.13 grams of $K_2S_2O_8$ were added and the temperature of the reaction mixture was maintained at 55° C. for 3 hours. At the end of this period it was observed that polymerization had taken place resulting in a polymeric solution containing 15.2% solids.

EXAMPLE 25

A reaction vessel was charged with 13.5 parts of $(CF_3)_2CFOCF_2CF_2CH_2CH_2OCOC(CH_3)=CH_2$ 19.8 parts of isodecyl methacrylate, 2.7 parts of hydroxypropyl methacrylate, 200 parts of deionized water and 9.75 parts of a 24% aqueous solution of cetyl dimethyl ammonium acetate (prepared by mixing 6 parts of cetyl dimethyl amine, 2 parts of glacial acetic acid and 24 parts of water). The reaction mixture was purged with nitrogen and heated to 49° C. At this point .27 grams of $K_2S_2O_8$ was added and the reaction mixture was maintained at a temperature between about 49–57° C. for a period of 96 minutes. At the end of this period it was observed that polymerization had taken place resulting in a polymeric solution containing 14.3% solids.

EXAMPLES 26–38

A number of polymers including homopolymers, interpolymers and copolymers of the fluorinated acrylic monomers of the invention were evaluated as textile treating agents for use in imparting oil and water repellency properties to the textile treated.

Water repellencies were measured by the Spray Test Method ASTM D–583–58 wherein water is sprayed against the taut surface of the fabric test specimen under controlled conditions and produces a wetted pattern indicative of the relative repellency or resistance to external wetting of the fabric. The fabric is rated by comparing its wetted pattern with pictures on a standard rating chart.

Wash fastness of the treated cloth was determined by Method 61–1961 (Test II A) of the American Association of Textile Chemists and Colorists which method is described on pages 105–106 of the Technical Manual and Yearbook of that association for the year 1961. Conditions employed in this test give results which correlate with the results of five average, careful hand launderings at a temperature of 120° F.

The effect of repeated dry cleaning of the treated cloth was determined by Method 85–1060T of the American Association of Textile Chemists and Colorists which method is described on pages 87–88 of the Technical Manual and Yearbook of that association for the year 1961. This test is based on an extensive series of interlaboratory tests which showed there is good correlation between the test and 3 commercial dry cleanings in a 4% charged system using perchloroethylene solvent.

The procedure employed in determining the oil repellency ratings is described, for example, on pages 323–4 of the April 1962 edition of the Textile Research Journal. This procedure involves gently placing on the treated fabric drops of mixtures of mineral oil ("Nujol") and n-heptane in varying proportions. The drops are allowed to stand on the treated fabric undisturbed for 3 minutes. After the 3 minute time period the wetting and penetration of the fabric is visually observed. The number corresponding to the mixture containing the highest percentage of heptane which does not penetrate or wet the fabric is considered to be the oil-repellency rating of the treated fabric.

Hydrophobic properties of the treated cloth were determined by Method 22–1961 of the American Association of Textile Chemists and Colorists which is described, for example, on pages 152–153 of the Technical Manual and Yearbook of the association for the year 1961.

Results of the tests are shown in Tables I–III below wherein water and oil repellencies of the test fabric are shown as initially treated, and after repeated washings and dry cleanings. The fabric used was 80" by 80" print cotton cloth.

In preparing the samples for test the 80" x 80" samples of cotton print cloth were saturated in the test solutions, following which the samples were dried at 110° C. for 5 minutes, cured at 160° C. for 3 minutes and then pressed and allowed to stand for 30 minutes before testing.

The polymer test materials were applied as aqueous emulsions or solutions as obtained in certain of the examples given above. In the tables, the polymers will be identified by the example number in which they were prepared.

TABLE I.—EVALUATION OF SUBJECT POLYMERS: WATER AND OIL REPELLENCY AND DURABILITY TO LAUNDERING AND DRY CLEANING

| | | | Initial | | Number of launderings | | | | | | | | | Number of dry-cleanings | | | | | | |
|---|---|---|---|---|---|---|---|---|---|---|---|---|---|---|---|---|---|---|---|---|
| | | Weight loading, | | | 5 | | 10 | | 15 | | 20 | | 5 | | 10 | | 15 | | 20 | |
| | Polymer | percent | WR | OR | WR | OR | WR | OR | WR | OR | WR | OR | WR | OR | WR | OR | WR | OR | WR | OR |
| Example: | | | | | | | | | | | | | | | | | | | | | |
| 26 | 4 | 6.9 | 50 | 100 | 0 | 90 | 0 | 80 | 0 | 80 | 0 | 70 | 50 | 90 | 0 | 90 | 0 | 90 | 0 | 80 |
| 27 | 6 | 5.7 | 50 | 100 | 50 | 100 | 25 | 90 | 0 | 80 | 0 | 80 | 50 | 100 | 50 | 90 | 0 | 90 | 0 | 80 |
| 28 | 14 | 4.6 | 50 | 100 | 50 | 100 | 0 | 90 | 0 | 80 | 0 | 70 | 50 | 90 | 0 | 90 | 0 | 80 | 0 | 80 |
| 29 | 10 | 3.8 | 70 | 120 | | | | | | | | | | | | | | | | |
| 30 | 8 | 2.0 | 70 | 130 | | | | | | | | | | | | | | | | |
| 31 | 15 | 0.60 | 80 | 100 | | 90 | | 90 | | | | | | 90 | | 90 | | | | |
| 32 | 16 | 0.70 | 80 | 110 | | 80 | | 60 | | | | | | | | 100 | | | | |

NOTE:
WR = Water repellency.
OR = Oil repellency.
Polymer 4 = Homopolymer of $(CF_3)_2CFOCF_2CF_2CH_2OCOCH=CH_2$.
Polymer 6 = Homopolymer of $(CF_3)_2CFOCF_2CF_2CH_2CH_2OCOC(CH_3)=CH_2$.
Polymer 14 = Copolymer of $(CF_3)_2CFOCF_2CF_2CH_2CH_2OCOCH=CH_2$ with N-methylol acrylamide.
Polymer 10 = Homopolymer of $(CF_3)_2CFOCF_2CF_2CF_2CH_2CH_2OCOC(CH_3)=CH_2$
Polymer 8 = Homopolymer of $(CF_3)_2CFOCF_2CF_2CF_2CF_2CF_2CH_2—OCOC(CH_3)=CH_2$.
Polymer 15 = Copolymer of $(CF_3)_2CFOCF_2CF_2CH_2CH_2OCOC(CH_3)=CH_2$ with methyl methacrylate.
Polymer 16 = Copolymer of $(CF_3)_2CFOCF_2CF_2CH_2CH_2OCOCH=CH_2$ with 2-ethylhexyl acrylate.

TABLE II.—EVALUATION OF SUBJECT POLYMERS: WATER AND OIL REPELLENCY AND DURABILITY TO LAUNDERING AND DRY CLEANING

| | | Weight loading, | Initial | | Number of launderings | | | | Number of dry cleanings | | | |
|---|---|---|---|---|---|---|---|---|---|---|---|---|
| | Polymer | percent | WR | OR | 2 OR | 5 OR | 10 OR | 20 OR | 2 OR | 5 OR | 10 OR | 20 OR |
| Example: | | | | | | | | | | | | |
| 33 | 2 | 0.8 | 50 | 110 | | 90 | 90 | 50 | | 90 | 90 | 60 |
| 34 | 13 | 1.0 | 70 | 110 | 100 | 90 | | | 90 | 90 | | |
| 35 | 17 | 1.0 | | 80 | | | | | | | | |
| 36 | 18 | 0.1 | | 90 | | | | | 90 | | | |
| 37 | 20 | 0.80 | 70 | 90 | | 90 | | | | 90 | | |
| 38 | 21 | 0.70 | 80 | 110 | 80 | 60 | | | | 100 | | |

NOTE:
WR = Water repellency.
OR = Oil repellency.
Polymer 2 = Homopolymer of $(CF_3))_2CFOCF_2CF_2CF_2CF_2CH_2CH_2OCOCH=CH_2$.
Polymer 13 = Interpolymer of $(CF_3)_2CFOCF_2CF_2CH_2OCOCH=CH_2$, $(CF_3)_2CFOCF_2CF_2CF_2CF_2CH_2CH_2OCOCH=CH_2$ and $(CF_3)_2CFOCF_2CF_2(CF_2CF_2)_2CH_2CH_2OCOCH=CH_2$.
Polymer 17 = Copolymer of $(CF_3)_2CFOCF_2CF_2CH_2CH_2OCOC(CH_3)=CH_2$ with hydroxypropyl methacrylate.
Polymer 18 = Copolymer of $(CF_3)_2CFOCF_2CF_2CH_2CH_2OCOC(CH_3)=CH_2$ with butyl methacrylate.
Polymer 20 = Copolymer of $(CF_3)_2CFOCF_2CF_2CH_2CH_2OCOC(CH_3)=CH_2$ with methyl methacrylate.
Polymer 21 = Copolymer of $(CF_3)_2CFOCF_2CF_2CH_2CH_2OCOC(CH_3)=CH_2$ with 2-ethylhexyl acrylate.

EXAMPLES 39–41

In these examples the polymer test material was incorporated in a typical formulation for enhancement of oil and water repellency properties. The formulations comprised the following:

| Ingredient: | Weight, percent |
|---|---|
| Test Polymer | 0.4 |
| "NALAN W" [1] | 2.0 |
| "MELTRON 80" [2] | 2.0 |
| Catalyst "PCC" [3] | 1.0 |
| Water | 94.6 |

[1] Trademark of E. I. du Pont de Nemours and Company for a thermosetting resin condensate used to contribute water repellency properties to fluorocarbon finishes.
[2] Trademark of Crown Chemical Corporation for a melamine formaldehyde condensate syrup, used to contribute durability properties to finishing compositions.
[3] Trademark of Crown Chemical Corporation for a modified zinc nitrate catalyst.

The pH of the formulations was adjusted to 3.8 with glacial acetic acid. The 80" x 80" samples of cotton cloth were saturated in the test solutions allowing for a 75% wet pick-up on the cloth. The cloth samples were then dried at 120° C. for 4 minutes, cured at 165° C. for 2 minutes and then pressed and allowed to stand for 30 minutes before testing.

The results of the oil and water repellency tests with the formulations described above are given in Table III.

TABLE III.—EVALUATION OF SUBJECT POLYMERS: WATER AND OIL REPELLENCY AND DURABILITY TO LAUNDERINGS AND DRY CLEANING

| | | Weight loading, percent | Number of launderings | | | | | | | | Number of dry cleanings | | | |
|---|---|---|---|---|---|---|---|---|---|---|---|---|---|---|
| | | | Initial | | 1 | | 3 | | 5 | | 1 | | 3 | |
| Example | Polymer | | WR | OR | WR | OR | WR | OR | WR | OR | WR | OR | WR | OR |
| 39 | 22 | .40 | 100 | 129 | 100 | 102 | 90 | ..... | 90 | 90 | 80 | 129 | 80 | 123 |
| 40 | 23 | .40 | 100 | 120 | 100 | 90 | 90 | 75 | 90 | 70 | 80 | ..... | ..... | ..... |
| 41 | 24 | .40 | 100 | 125 | 90 | 90 | 75 | 80 | ..... | ..... | 80 | 90 | ..... | ..... |

NOTE:
WR=Water repellency.
OR=Oil repellency.
Polymer 22=Terpolymer of $(CF_3)_2CFOCF_2CF_2CH_2CH_2OCOC(CH_3)=CH_2$ with butyl acrylate with N-methylol acrylamide.
Polymer 23=Copolymer of $(CF_3)_2CFOCF_2CF_2CH_2CH_2OCOC(CH_3)=CH_2$ with dimethyl aminoethyl methacrylate.
Polymer 24=Copolymer of $(CF_3)_2CFOCF_2CF_2CH_2CH_2OCOC(CH_3)=CH_2$ with butyl acrylate.

Since various changes and modifications may be made in the invention without departing from the spirit thereof, it is intended that all matter contained in the above description shall be interpreted as illustrative and not in a limiting sense.

We claim:

1. Novel fluorinated acrylates having the formula

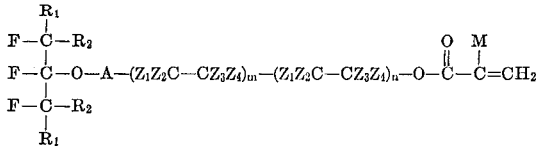

wherein
(a) $R_1$ and $R_2$ are each F, Cl, alkyl or haloalkyl groups, or when taken together, are alkylene or haloalkylene groups forming a cycloaliphatic structure, which $R_1$ and $R_2$ groups may each have from 1 to 9 carbon atoms and which halogen atoms, if any, have an atomic weight not exceeding about 79.92, with the proviso that no more than two of the $R_1$ and $R_2$ groups are alkyl groups and no more than three of the $R_1$ and $R_2$ groups are haloalkyl groups;
(b) A is a radical of the formula —$CFR_3$—$CR_4R_5$— in which $R_3$ and $R_4$ are independently selected from the group consisting of F and H, and $R_5$ is selected from the group consisting of H, F, Cl, Br and perfluoroalkyl;
(c) $Z_1$, $Z_2$, $Z_3$ and $Z_4$ may each be selected from the group consisting of H, F, Cl and Br provided that $Z_1$–$Z_4$ do not include more than two chlorine atoms or one bromine atom,
  (1) when at least two members of the group $Z_1$, $Z_2$, $Z_3$ and $Z_4$ are H or F, the remaining two members may each be a perhalomethyl group having the formula —$C(X_a)_3$, wherein $X_a$ is a halogen atom having an atomic weight not exceeding about 79.91,
  (2) When $Z_1$ and $Z_3$ are each H or F, each of $Z_2$ and $Z_4$ may additionally be selected from the group consisting of —$CF_2X_b$, —$Y_1$—$OY_2$, —$Y_1$—$Y_3$ and —O—$Y_4$ wherein $X_b$ is an alkyl radical having from 1–8 carbon atoms, or a haloalkyl radical having from 1–8 carbon atoms in which haloalkyl radical the halogen atoms have an atomic weight not exceeding about 79.91; $Y_1$ is a saturated divalent alkylene bridging group or a saturated divalent haloalkylene bridging group in which the halogen atoms have atomic weights not exceeding about 79.91; $Y_2$ is a member selected from the group consisting of H and alkyl; $Y_3$ is aryl and $Y_4$ is alkyl,
  (3) $Z_3$ and $Z_4$ and $Z_1$ and $Z_3$ may be joined together to form a cycloaliphatic ring system;
(d) M is a member selected from the group consisting of H or $CH_3$,
(e) $m$ is an integer from 1–40; and
(f) $n$ is an integer from 0–40, with the proviso that the terminal carbon atom in the —($Z_1Z_2C$—$CZ_3Z_4$)— group which is bonded to the —O— atom is additionally bonded to two hydrogen atoms.

2. Fluorinated acrylates according to claim 1 wherein $m$ and $n$ are each integers from 1–7, inclusive.

3. Fluorinated acrylates according to claim 2 wherein the $R_1$ and $R_2$ groups are F or perfluoroalkyl groups.

4. Fluorinated acrylates as described in claim 3 wherein the $R_1$ and $R_2$ groups are each perfluoroalkyl groups.

5. Fluorinated acrylates according to claim 3 wherein the $R_1$ and $R_2$ groups are each F.

6. Fluorinated acrylates as described in claim 4 wherein the —$Z_1Z_2C$—$CZ_3Z_4$— moieties are selected from the group consisting of —$CF_2$—$CF_2$—, —$CF_2$—$CH_2$—, —$CF_2$—$CClF$—, —$CF_2CF(CF_3)$—, and —$CHCH_2$—.

7. Fluorinated acrylates as described in claim 5 wherein the —$Z_1Z_2C$—$CZ_3Z_4$— moieties are selected from the group consisting of $CF_2$—$CF_2$—, —$CF_2$—$CH_2$—, —$CF_2$—$CClF$—, —$CF_2CF(CF_3)$—, and —$CH_2CH_2$—.

8. Fluorinated acrylates as described in claim 7 wherein the —$Z_1Z_2C$—$CZ_3Z_4$— moieties are selected from the group consisting of —$CF_2CH_2$— and —$CF_2$—$CClF$—.

9. Fluorinated acrylates as described in claim 1 which have the formula

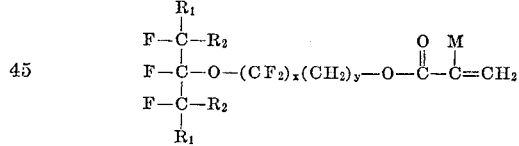

wherein M is as defined in claim 1 and $x$ and $y$ are the same or different integers from 1–20 inclusive.

10. Fluorinated acrylates as described in claim 9 wherein $R_1$ and $R_2$ are alkyl or haloalkyl groups.

11. Fluorinated acrylates as described in claim 9 wherein $R_1$ and $R_2$ are each perfluoroalkyl groups or F.

12. Fluorinated acrylates as described in claim 11 wherein $R_1$ and $R_2$ are each perfluoroalkyl groups.

13. Fluorinated acrylates as described in claim 11 wherein $R_1$ and $R_2$ are each F.

14. Fluorinated acrylates as described in claim 11 wherein $x$ is any integer from 1–10 and $y$ is 1.

15. Fluorinated acrylates as described in claim 11 wherein $x$ is an even number from 2–10 and $y$ is a number from 3–10.

16. Fluorinated acrylates as described in claim 11 wherein $x$ is an even number from 2–10 and $y$ is 2 or 3.

17. Fluorinated acrylates as described in claim 11 wherein $x$ is an odd number from 1–10 and $y$ is an even or odd number from 4–10.

18. Fluorinated acrylates as described in claim 13 wherein the sum of $x$ and $y$ does not exceed 10.

19. A fluorinated acrylate as described in claim 13 which is

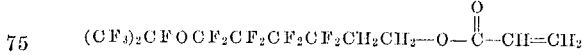

20. A fluorinated acrylate as described in claim 13 which is $(CF_3)_2CFOCF_2CF_2CH_2CH_2OCOCH=CH_2$.

21. A fluorinated acrylate as described in claim 13 which is $(CF_3)_2CFOCF_2CF_2CH_2CH_2OCOC(CH_3)=CH_2$.

22. A fluorinated acrylate as described in claim 13 which is $(CF_3)_2CFOCF_2CF_2(CF_2CF_2)_2CH_2CH_2OCOCH=CH_2$ 23. A fluorinated acrylate as described in claim 13 which is $(CF_3)_2CFOCF_2CF_2CF_2CF_2CH_2CH_2OCOC(CH_3)=CH_2$ 24. A fluorinated acrylate as described in claim 13 which is
$(CF_3)_2CFOCF_2CF_2(CF_2CF_2)_2$
$CH_2CH_2OCOC(CH_3)=CH_2$ 25. Polymers comprising recurring units of the formula

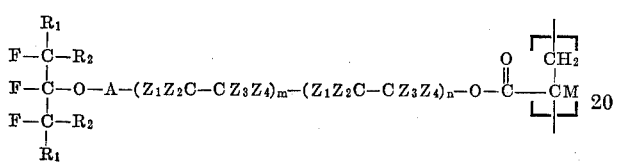

wherein $R_1$, $R_2$, A, $Z_1$, $Z_2$, $Z_3$, $Z_4$, M, $m$ and $n$ are as defined in claim 1.

26. Polymers according to claim 25 wherein $m$ and $n$ are each integers from 1–7, inclusive.

27. Polymers according to claim 25 comprising recurring units of the formula

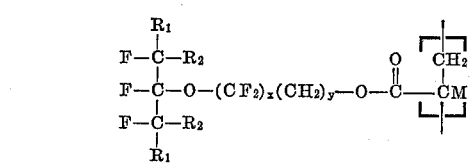

wherein $R_1$, $R_2$ and M are as defined in claim 24 and wherein $x$ and $y$ are integers from 1–20 inclusive and may be the same or different.

28. Polymers according to claim 27 wherein $R_1$ and $R_2$ are each perfluoroalkyl groups or F.

29. Polymers according to claim 28 wherein $R_1$ and $R_2$ are each F.

30. Polymers according to claim 29 comprising recurring units of the formula

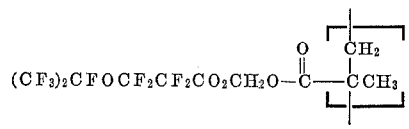

31. Polymers according to claim 29 comprising recurring units of the formula

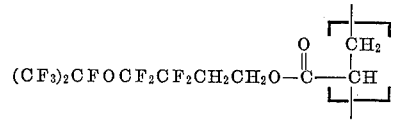

32. A homopolymer comprising recurring units as described in claim 30.

33. A homopolymer comprising recurring units as described in claim 31.

34. A textile fabric sized with a polymer according to claim 25.

35. A textile fabric sized with a polymer according to claim 27.

36. Fibers coated with a polymer as described in claim 25.

37. Fibers coated with a polymer as described in claim 27.

38. Porous materials coated with a polymer as described in claim 25.

39. Porous materials coated with a polymer as described in claim 27.

References Cited

UNITED STATES PATENTS

| | | | |
|---|---|---|---|
| 3,424,785 | 1/1969 | Pittman et al. | 260—89.5H |
| 3,438,946 | 4/1969 | Lichstein et al. | 260—89.5H |
| 3,457,247 | 7/1969 | Katsushima et al. | 260—89.5H |

HARRY WONG, Jr., Primary Examiner

U.S. Cl. X.R.

117—132, 139.5, 140, 145, 148, 155, 161; 204—159.22; 260—28.5, 29.6, 63, 78.5, 79.3, 83.5, 86.1, 86.3, 86.7, 486, 828, 874, 898, 900, 901

UNITED STATES PATENT OFFICE
CERTIFICATE OF CORRECTION

Patent No. 3,547,861          Dated December 15, 1970

Inventor(s) Louis Gene Anello, Richard Francis Sweeney and Morton Herbert Litt

It is certified that error appears in the above-identified patent and that said Letters Patent are hereby corrected as shown below:

Column 3, line 29, "substitutents" should read --substituent:

Column 7, line 10, "pentional" should read --ventional--

Column 7, line 65, "one" should be deleted

Column 8, line 2, insert -- - -- between "1,1,2" and "trichlc trifluoroethane"

Column 11, line 30, in sixth formula from the top of the colu $$\begin{matrix} \text{O} & \text{CH}_2 \\ \| & | \\ -\text{O}-\text{C}-\text{C}=\text{CH}_2 \end{matrix}$$   should read $$\begin{matrix} \text{O} & \text{CH}_3 \\ \| & | \\ -\text{O}-\text{C}-\text{C}=\text{CH}_2 \end{matrix}$$

Column 11, line 42, in ninth formula from the top of the colu $$\begin{matrix} \text{C} & \text{H} \\ \| & | \\ -\text{O}-\text{C}=\text{CH}_2 \end{matrix}$$   should read $$\begin{matrix} \text{O} & \text{H} \\ \| & | \\ -\text{O}-\text{C}-\text{C}=\text{CH}_2 \end{matrix}$$

(Continued on Page 2)

UNITED STATES PATENT OFFICE
CERTIFICATE OF CORRECTION

Patent No. 3,547,861          Dated December 15, 1970

Inventor(s) Louis Gene Anello, Richard Francis Sweeney and Morton Herbert Litt

It is certified that error appears in the above-identified patent and that said Letters Patent are hereby corrected as shown below:

-2-

Column 12, line 37, in eighth formula from the top of the column, last line of the formula, "FCFCl)$_4$" should read -- F(CFCl)$_4$ --

Column 13, line 15, third formula from the top of the column

"
$$\begin{array}{c} \quad\; O\;\; CH_3 \\ \quad\; \|\;\; | \\ -O-C-C=CH_2 \end{array}$$
" should read --
$$\begin{array}{c} \quad\; O\;\; H \\ \quad\; \|\;\; | \\ -O-C-C=CH_2 \end{array}$$
--

Column 13, line 26, fourth formula from the top of the column

"
$$\begin{array}{c} \quad\; O\;\; H \\ \quad\; \|\;\; | \\ -O-C-C=CH_2 \end{array}$$
" should read --
$$\begin{array}{c} \quad\; O\;\; CH_3 \\ \quad\; \|\;\; | \\ -O-C-C=CH_2 \end{array}$$
--

(Continued on Page 3)

UNITED STATES PATENT OFFICE
CERTIFICATE OF CORRECTION

Patent No. 3,547,861         Dated December 15, 1970

Inventor(s) Louis Gene Anello and Richard Francis Sweeney and Morton Herbert Litt It is certified that error appears in the above-identified patent and that said Letters Patent are hereby corrected as shown below:

-3-

Column 14, line 26, seventh formula from the top of the colum

" $-O-CH_2CF_2CF_2CH_2-O-\overset{O}{\underset{\|}{C}}-\overset{H}{\underset{|}{C}}-CH_2$ "   should read -- $-O-CF_2CF_2CF_2CH_2-O-\overset{O}{\underset{\|}{C}}-\overset{H}{\underset{|}{C}}=CH_2$   --

Column 14, line 69,

" $(CF_3)_2CFOCF_2CH_2CH_2CH_2OCOC(CH_3)=CH_2$ " should re

-- $(CF_3)_2CFOCF_2CF_2CH_2CH_2OCOC(CH_3)=CH_2$ --

Column 16, line 33, "condense" should read --condenser--

Column 16, line 37, "$(CF_3)CFO\ CF_2CF_2CH_2CH_2OH$ "   should re

--$(CF_3)_2CFOCF_2CF_2CH_2CH_2OH$ --

Column 17, line 43, "55°" should read --55°C.--

Column 20, line 7, Example 23, "aminoethly" should read --aminoethyl--

(Continued on Page

UNITED STATES PATENT OFFICE
CERTIFICATE OF CORRECTION

Patent No. __3,547,861__  Dated __December 15, 1970__

Inventor(s) __Louis Gene Anello, Richard Francis Sweeney and Morton H. Litt__

It is certified that error appears in the above-identified patent and that said Letters Patent are hereby corrected as shown below:

-4-

Columns 21-22, Table I, line beginning with "Polymer 4", in formula,

" $(CF_3)_2CFOCF_2CF_2CH_2OCOCH=CH_2$ " should re

-- $(CF_3)_2CFOCF_2CF_2CH_2CH_2OCOCH=CH_2$ --

Table I, line beginning with "Polymer 10", in formula,

" $(CF_3)_2CFOCF_2CF_2CF_2CH_2CH_2OCOC(CH_3)=CH_2$ should read

-- $(CF_3)_2CFOCF_2CF_2CF_2CF_2CH_2CH_2OCOC(CH_3)=CH$

Column 24, line 33, Claim 6, last formula

"$-CHCH_2-$" should read -- $-CH_2CH_2-$ --

Column 24, line 36, Claim 7, "$CF_2-CF_2-$" should read

-- $-CF_2-CF_2-$ --

(Continued on Page 5)

UNITED STATES PATENT OFFICE
CERTIFICATE OF CORRECTION

Patent No. 3,547,861     Dated December 15, 1970

Inventor(s) Louis Gene Anello, Richard Francis Sweeney and Morton Herbert Litt

It is certified that error appears in the above-identified patent and that said Letters Patent are hereby corrected as shown below:

-5-

Column 26, line 5, Claim 30, in formula,

"$(CF_3)_2CFOCF_2CF_2CO_2CH_2O-$" should read

--$(CF_3)_2CFOCF_2CF_2CH_2CH_2O-$ --

Signed and sealed this 20th day of July 1971.

(SEAL)
Attest:

EDWARD M. FLETCHER, JR.
Attesting Officer

WILLIAM E. SCHUYLER, JR.
Commissioner of Patents